United States Patent [19]

Muzslay

[11] Patent Number: 5,288,242

[45] Date of Patent: Feb. 22, 1994

[54] RING LOCK CONNECTOR

[75] Inventor: Steven Z. Muzslay, Huntington Beach, Calif.

[73] Assignee: ITT Corporation, Secaucus, N.J.

[21] Appl. No.: 914,727

[22] Filed: Jul. 20, 1992

[51] Int. Cl.⁵ .......................................... H01R 13/627
[52] U.S. Cl. .................................... 439/349; 439/596; 439/685; 285/141
[58] Field of Search .......................... 439/345–347, 439/349, 350, 351, 356, 596, 682–687, 690, 694–697; 285/321, 921, 141

[56] References Cited

U.S. PATENT DOCUMENTS

| | | | |
|---|---|---|---|
| 2,999,221 | 9/1961 | Ellis et al. | 339/176 |
| 3,297,344 | 1/1967 | Hanes | 285/141 |
| 3,636,495 | 1/1972 | Forsyth, Jr. | 439/694 |
| 3,793,610 | 2/1974 | Brishka | 339/74 |
| 4,089,580 | 5/1978 | Huffnagle et al. | 439/400 |
| 4,247,147 | 1/1981 | Rettkowski | 285/321 |
| 4,410,230 | 10/1983 | SanMiguel | 439/682 |
| 4,516,821 | 5/1985 | Nieman | 339/75 |
| 4,580,865 | 4/1986 | Fryberger | 439/277 |
| 4,597,620 | 7/1986 | Lindner et al. | 439/350 |
| 4,671,591 | 6/1987 | Archer | 439/909 |
| 4,752,246 | 6/1988 | Triner et al. | 439/682 |
| 4,781,487 | 11/1988 | Greco | 285/321 |

Primary Examiner—Gary F. Pauman
Assistant Examiner—Hien D. Vu
Attorney, Agent, or Firm—Thomas L. Peterson

[57] ABSTRACT

A connector is described, which can be inserted into a hole in a base to securely mount therein while enabling removal and secure reinstallation. The base (14, FIG. 3) has a hole with an undercut groove (30). A connector mount portion (24) has a recess (42) that holds a snap ring (26). The snap ring has a gap that allows the snap ring to contract during insertion, and to then expand to lock into the groove in the base. An elastomeric spring ring (50) lies between the bottom of the recess in the mount portion and the radially inner surface of the snap ring, to prevent the snap ring from falling off prior to installation of the connector. The spring ring is readily compressed (at 50 in FIG. 8) when the snap ring is compressed during installation. A pair of contacts of the connector include vertical and horizontal portions (100, 102, FIG. 3) connected by a middle portion (110) that is bent at a right angle. The contacts are originally straight and inserted vertically into the connector, and then the top is pushed sidewardly to bend the middle portion against a corner portion (112) of the frame. Thereafter, a cap part (120) of the frame upper portion can be pivoted closed on a living hinge.

10 Claims, 5 Drawing Sheets

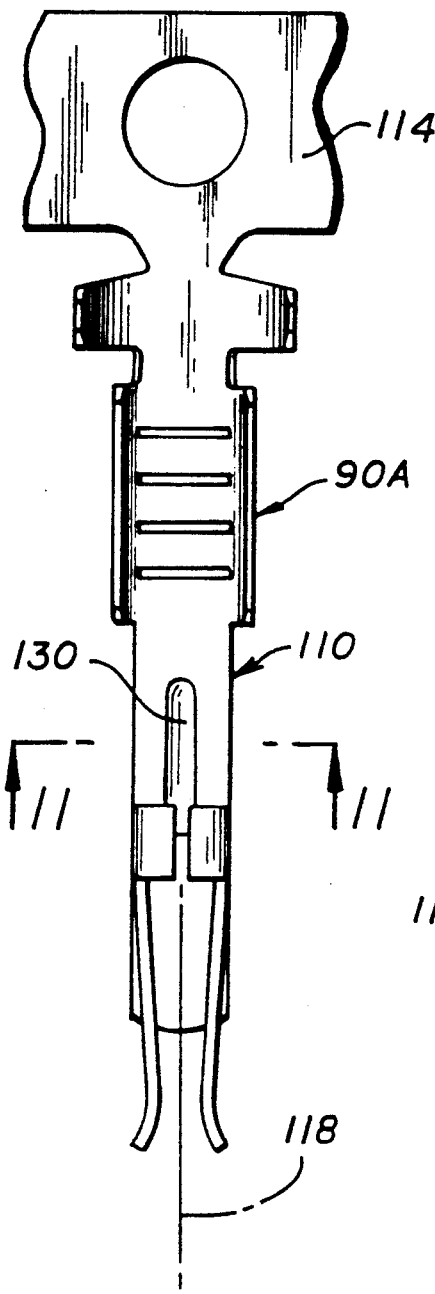
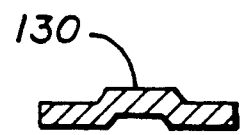
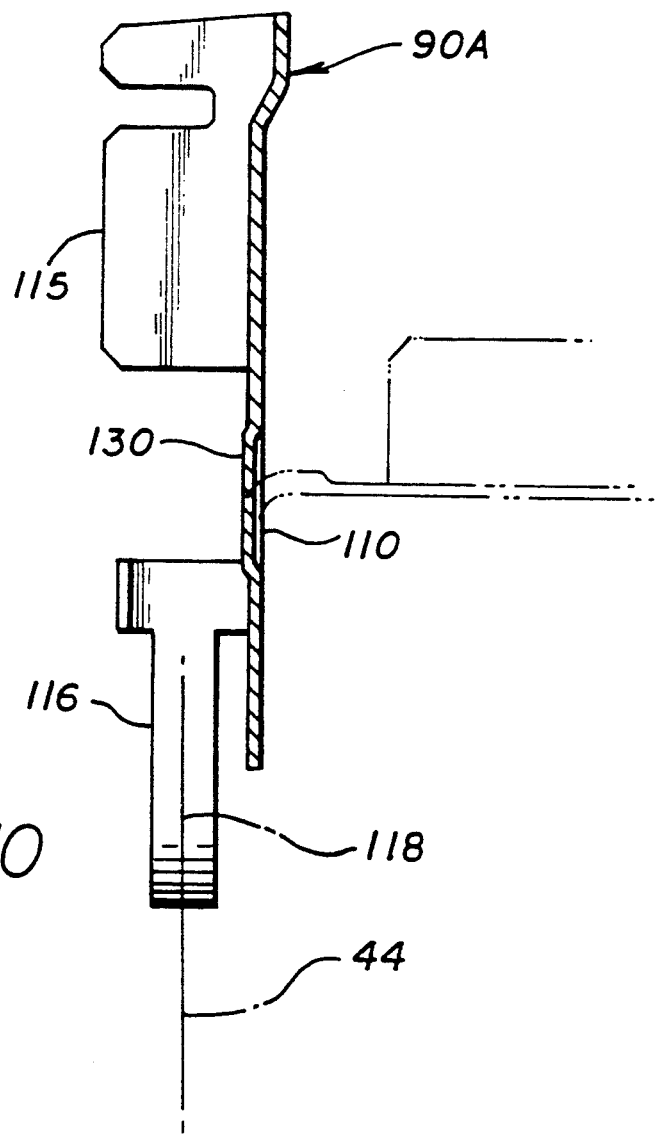
FIG. 9
FIG. 11
FIG. 10

RING LOCK CONNECTOR

BACKGROUND OF THE INVENTION

Automobile air bags are inflated by an initiator having a squib that is electrically ignited by currents from an initiator circuit. In a commonly used design, the initiator is mounted on the lower end of a base that has a hole whose upper end receives a connector. The connector has contacts that engage squib terminals, and that are connected through wires to the initiator circuit. Currently, the connector comprises a molded frame with molded-in retainer tines that lock into an undercut groove in the base hole. The connector cannot be removed from the base without permanently damaging the connector frame. A connector which could be securely locked in a base hole and yet which could be removed and reused, would be of considerable value. Such connector construction would be useful not only in airbag squib connectors, but in other applications where secure locking and/or removable locking is required.

SUMMARY OF THE INVENTION

In accordance with one embodiment of the present invention, a connector is provided which can mount in a base that has a hole with a groove, wherein the connector can be securely locked in the base and preferably is removable and reinstallable therein. The connector includes a frame having a mount portion for insertion in the base hole, the mount portion having an annular recess on its outside. A snap ring with a gap therein, lies in the recess. A continuous elastomeric spring ring lies in the recess immediately within the snap ring. The elastomeric spring ring keeps the snap ring centered on the mount portion to prevent its loss during handling, and yet enables large compression in the diameter of the snap ring during its installation.

The connector contacts have vertically-extending and horizontally-extending portions connected by a middle portion having a substantially 90° bend. The contacts are originally straight, and are installed by inserting them vertically into a passage of the frame, and then bending the contacts so their upper portions are bent to extend horizontally. The frame has a corner portion against which the middle portion is bent. The contact middle portion can be provided with a protrusion that extends around the bend, to avoid spring-back after the contact has been bent. The upper portion of the contact includes a cap part connected to the rest of the upper portion by a living hinge, but narrower than the rest of upper portion. The cap part is latched closed after the spring contacts have been bent.

The novel features of the invention are set forth with particularity in the appended claims. The invention will be best understood from the following description when read in conjunction with the accompanying drawings.

BRIEF DESCRIPTION OF THE DRAWINGS

FIG. 9 is a front elevation view of one of the contacts of the connector of FIG. 3, showing it lying on a carrier strip.

FIG. 10 is a side elevation view of just the contact of FIG. 9, and showing in phantom lines, how a portion of the contact can be bent.

FIG. 11 is a sectional view taken on the line 11—11 of FIG. 9.

DESCRIPTION OF THE PREFERRED EMBODIMENT

Figure 1:
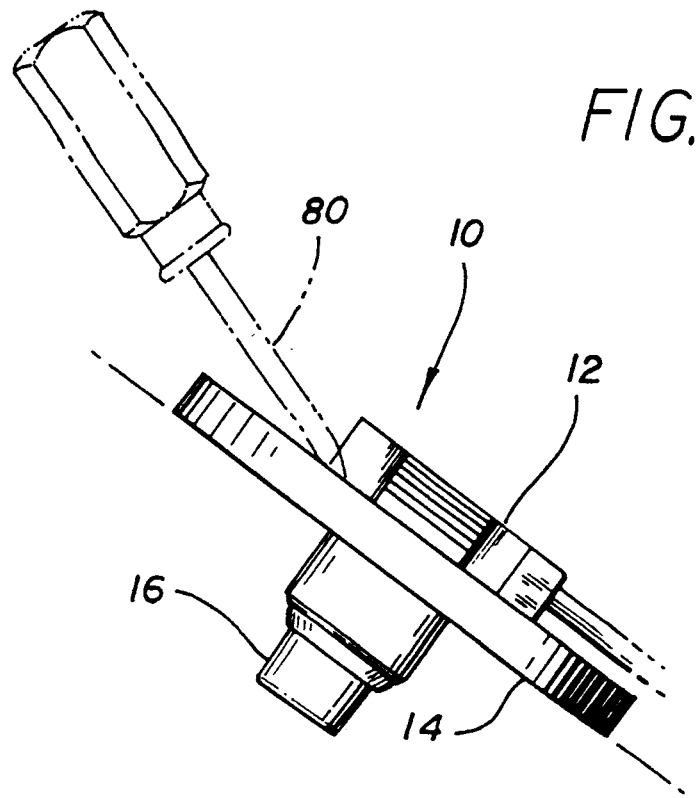
FIG. 1 is a side view of a connector and base assembly showing them in a commonly used position and also indicating how a screwdriver blade can be used to remove the connector from the base.
Figure 2:
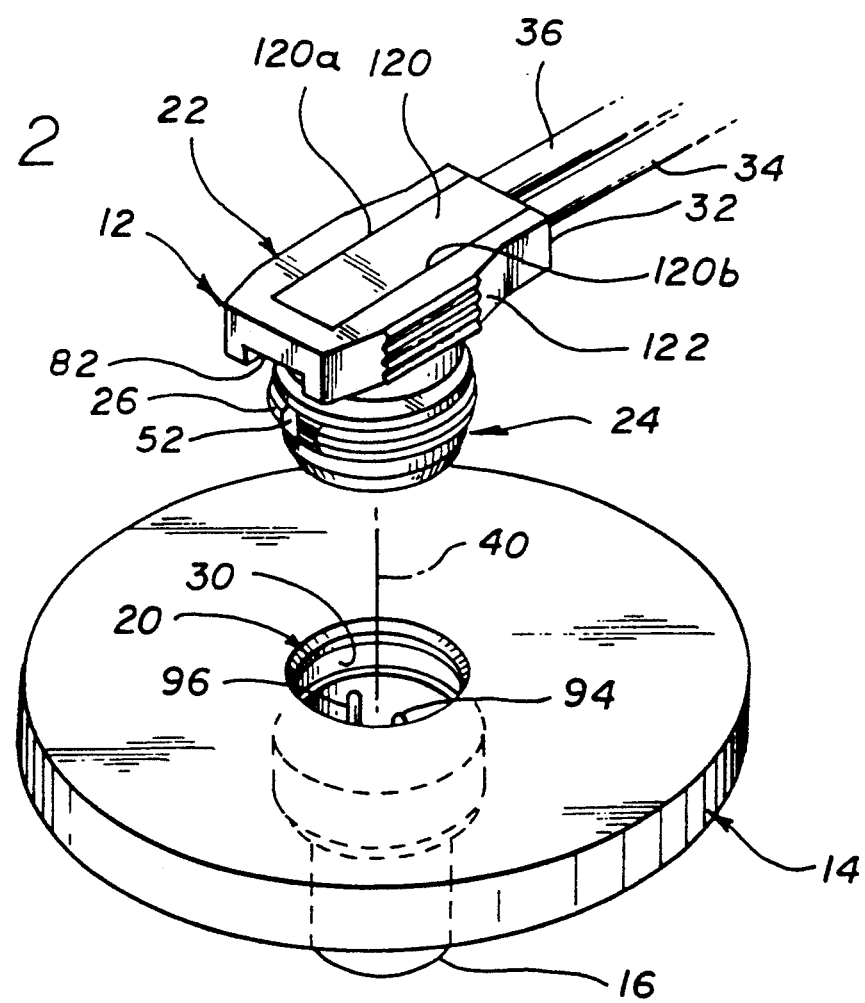
FIG. 2 is an exploded isometric view of the connector and base of FIG. 1.

FIG. 1 illustrates an assembly 10 of a connector 12 and base 14. The base holds an initiator 16 which is used to inflate an airbag in an automobile. The base 14 is often mounted in the orientation shown in FIG. 1, although it can be mounted in other orientations. As shown in FIG. 2, the base 14 is formed of metal such as aluminum, and has a hole 20 for receiving a portion of the connector 12. The connector includes a molded frame 22 with a mount portion 24 that can fit into the hole. A snap ring 26 on the mount portion 24, can snap into an undercut groove 30 formed in the base hole to resist removal of the connector after it has been installed. The frame has an upper portion 32 that lies on top of the base 14, with a pair of wires 34, 36 extending from the upper portion. The wires 34, 36 connect to contacts that engage corresponding terminals 94, 96 of the initiator, to carry current to the initiator when the airbag is to be inflated.

The base hole as an axis 40 which is shown as extending vertically in all the drawings except for FIG. 1. Applicant uses terms such as "vertical", "horizontal", etc. in the following description of the invention to aid in describing the parts as shown in most of the drawings, but it should be understood that the connector and base can be used in other orientations with respect to gravity.

Figure 3:
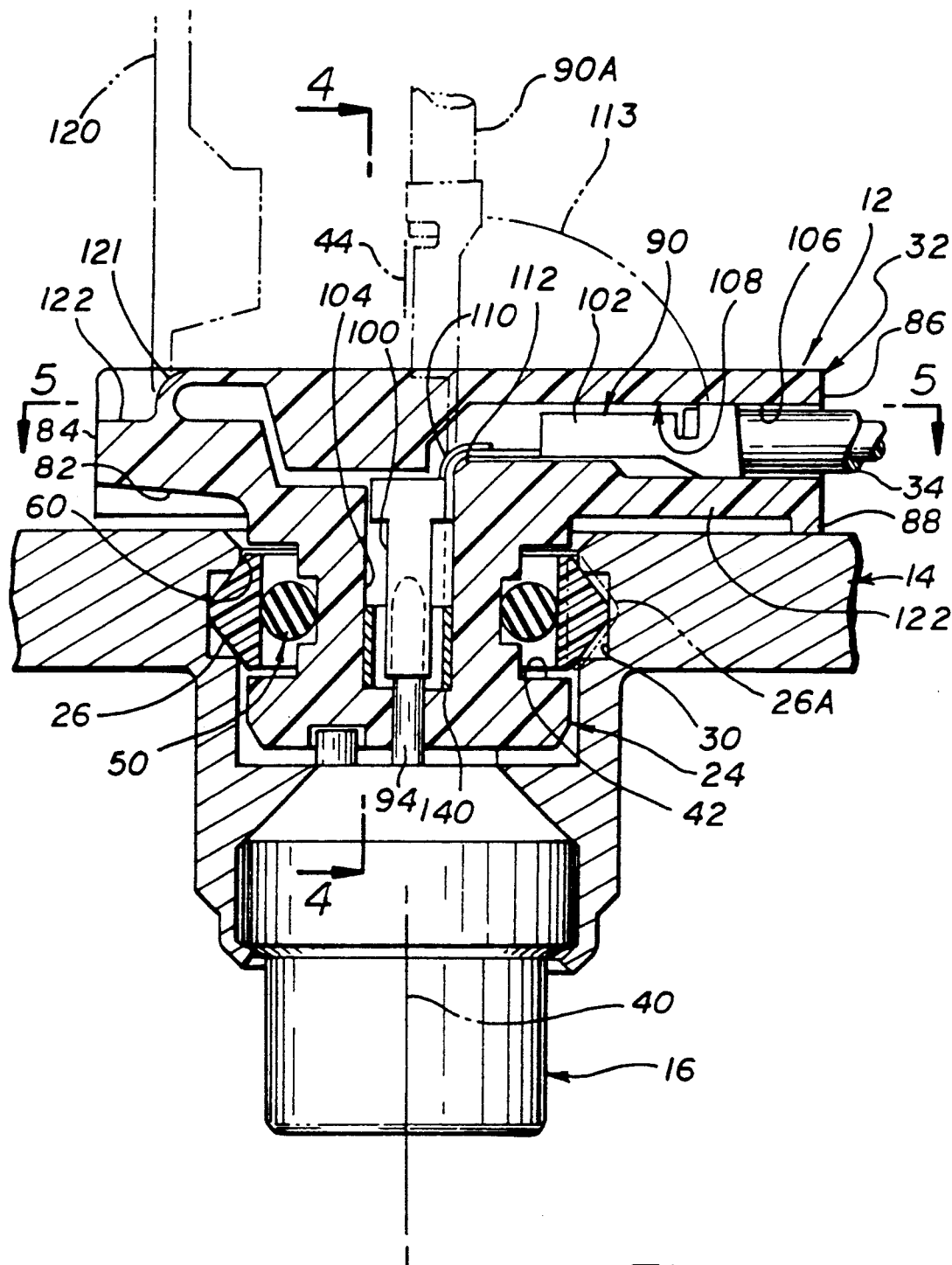
FIG. 3 is a sectional view of the connector and base of FIG. 2, shown in their fully assembled position.

As shown in FIG. 3, the mount portion 24 of the connector frame has an annular recess 42 that holds the snap ring 26 to allow the snap ring to expand and contract radially with respect to the connector axis 44 (which lies concentric with the base hole axis 40 after installation). When the snap ring expands fully without constraint, it expands to the position shown at 26A, wherein it still lies within the recess 42, and the recess helps prevent the snap ring from falling off the connector. A spring ring 50 which is formed of soft elastomeric material, and which is shown as being in the form of an O-ring, lies radially between the snap ring 26 and the mount portion 24 of the frame. A major purpose of the spring ring 50 is to prevent loss of the snap ring 26 during handling, as will be described below.

Figure 7:
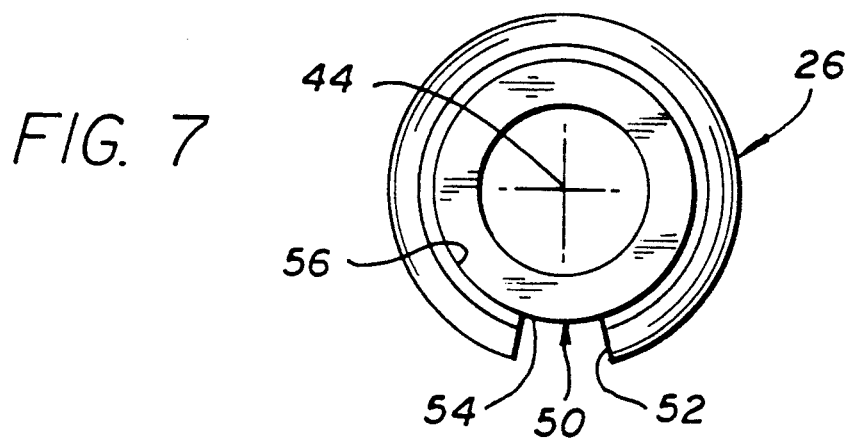
FIG. 7 is a plan view of the rings of the connector of FIG. 3.

FIG. 7 shows the shape of the snap ring 26 and of the spring ring 50 as viewed along the axis 44 of the connector. It can be seen that the snap ring 26 has a large gap 52 that extends by an angle of about 30° relative to the axis 44. This gap 52 is provided to enable considerable contraction of the snap ring to enable it to be installed in the base hole. The spring ring 50 is preferably continuous, without any gap. The radially outer surface or periphery 54 of the spring ring substantially abuts the radially inner surface or inside 56 of the snap ring, i.e. the snap ring lies closely around the spring ring. This assures that so long as the spring ring 50 remains concentric with the axis 44, the snap ring 26 will also remain concentric with the axis 44, to prevent the snap ring from falling off the connector mount portion. The spring ring 50 is constructed so it lies closely around the mount portion of the connector to keep it substantially concentric with the connector axis.

Figure 8:
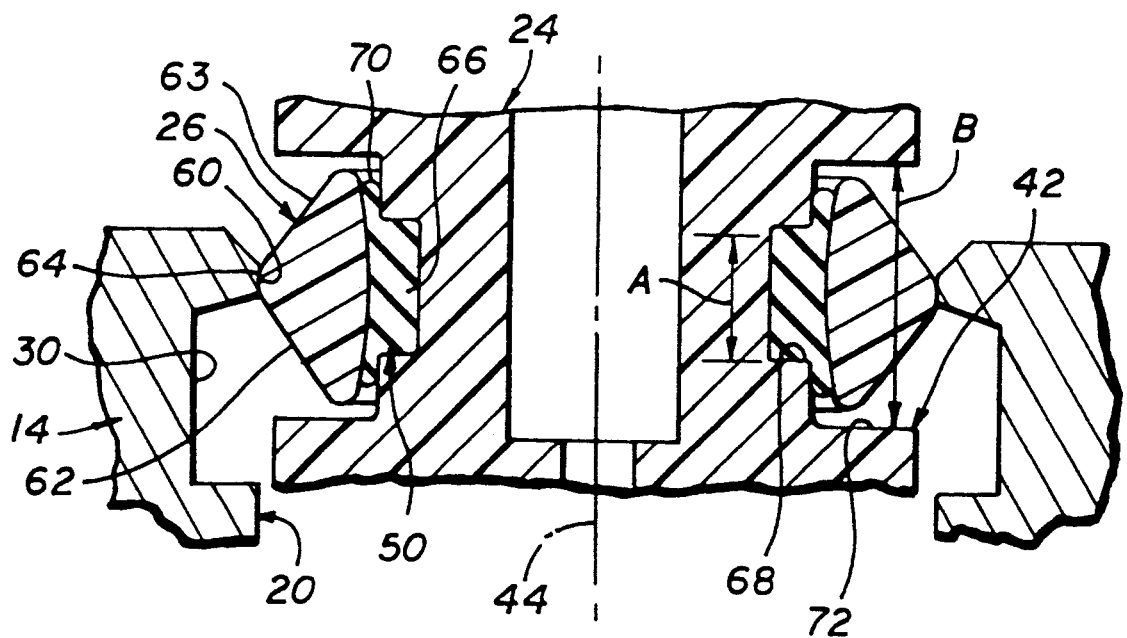
FIG. 8 is a partial sectional view of the connector and base of FIG. 3, showing the connector during the course of its installation on the base.

FIG. 8 shows the assembly during installation of the connector mount portion 24 in the base hole 20. The base hole has a top portion with a constriction location 60 where the hole is of minimal diameter above the groove 30. As the connector is pushed down, a beveled surface 62 on the snap ring contracts the snap ring until the periphery 64 of the snap ring passes the constriction location. During such compression of the snap ring, the elastomeric spring ring 50 undergoes large compression and deformation, until it achieves the hat shape shown, which includes an upstanding hat portion 66 which lies in a radially inner portion 68 of the recess 42, and a hat rim 70 which lies in the radially outer portion 72 of the recess. The radially outer portion of the recess has a greater length B parallel to the connector axis, than the length A of the radially inner portion 68. With the orientation of FIG. 8, it may be said that the radially outer portion has a greater height B than the height A of the radially inner portion. The height B of the outer portion is chosen to position the snap ring, while the height A of the inner portion is chosen to position the spring ring near the middle of the height of the snap ring.

The snap ring 26 is constructed of a nonelastomeric resilient material, and preferably of a high strength engineering plastic which has a Young's modulus at least on the order of 300,000 psi in tension and shear, and usually about 300,000 psi. A wide variety of engineering plastics can be used, such as a nylon, polystyrene, polyethersultone, polyetherimide, or polymethylmethacrylate. The elastomeric spring ring 50, on the other hand, is preferably formed of an elastomer, which has a Young's modulus on the order of 3,000 psi or less, and usually less than 3,000 psi. Applicant prefers to use a silicone rubber having a durometer of about 40, and a Young's modulus of about 500, which defines a soft rubber that can be easily deformed. Referring to FIG. 8, it can be understood that when the periphery 64 of the snap ring passes down below the constriction 60, the beveled upper surface 63 of the snap ring will snap into the groove 30 and securely retain the snap ring, and therefore the connector, to the base 14.

Although applicant prefers to use an elastomer for the spring ring, it is conceivable that the spring ring could have other constructions such as where it is formed of a helical spring.

The construction of the snap ring enables removal of the connector from the base, and its reinstallation in the base. Removal can be accomplished by applying a screwdriver as shown in FIG. 1, so the tip of the blade 80 lies in a blade-receiving indentation 82 (FIG. 3) at a first end 84 of the frame upper portion 32. The opposite second end 86 of the connector upper portion has a foot 88 that lies against the base 14. When a blade lies in the indentation 82 and is used to pry up the first end 84, the foot 88 near the extreme second end 86 minimizes pivoting of the connector to facilitate contraction of the snap ring and its upward passage through the most constricted location along the base hole.

Figure 5:
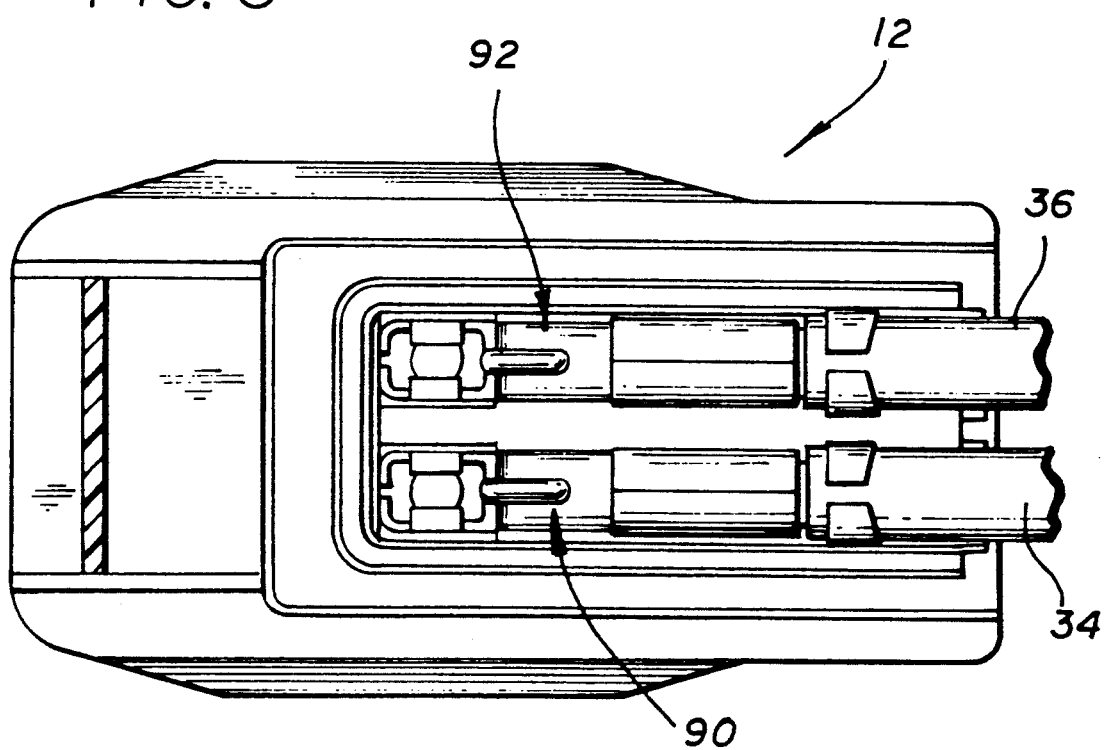
FIG. 5 is a view taken on the line 5—5 of FIG. 3, with the cap part not shown.

As shown in FIG. 5, the connector has two contacts 90, 92 which serve to connect a corresponding one of the wires 34, 36 to a corresponding one of two terminals 94, 96 (FIG. 2) of the initiator. As shown in FIG. 3, each contact such as 90 has vertically and horizontally extending portions 100, 102 lying in corresponding vertically and horizontally extending passage portions 104, 106 of a connector frame passage 108. The vertically and horizontally extending portions of the contact are joined by a middle portion 110 which forms a substantially 90° bend. Applicant initially forms the contact 90 in the straight configuration shown in phantom lines at 90A, wherein the two elongated contact portions 100, 102 both extend vertically and the middle portion 110 is straight rather than bent. After the portion 100 is fully installed on the initiator terminal 94, applicant bends the middle portion by moving the horizontally-extending portion 102 along the curve shown at 113 to the final position. A convex wall or corner 112 of the frame lies closely within the bend and supports the contact middle portion during its bending. As shown in FIG. 9, the contacts at 90A are formed from a metal sheet which includes a carrier 114 that holds multiple contacts together, which can be wound onto a spool. As shown in FIG. 10, the contact has sidewardly extending portions 115, 116 that partially envelop the contact axis 118 (which is aligned with the connector axis when seen in FIG. 3), except along the strip-like middle portion 110 where strip portions merge. By not forming the 90 bend until the vertically extending portion has been installed, applicant can more easily handle the multiple contacts held on a single carrier 114.

Figure 4:
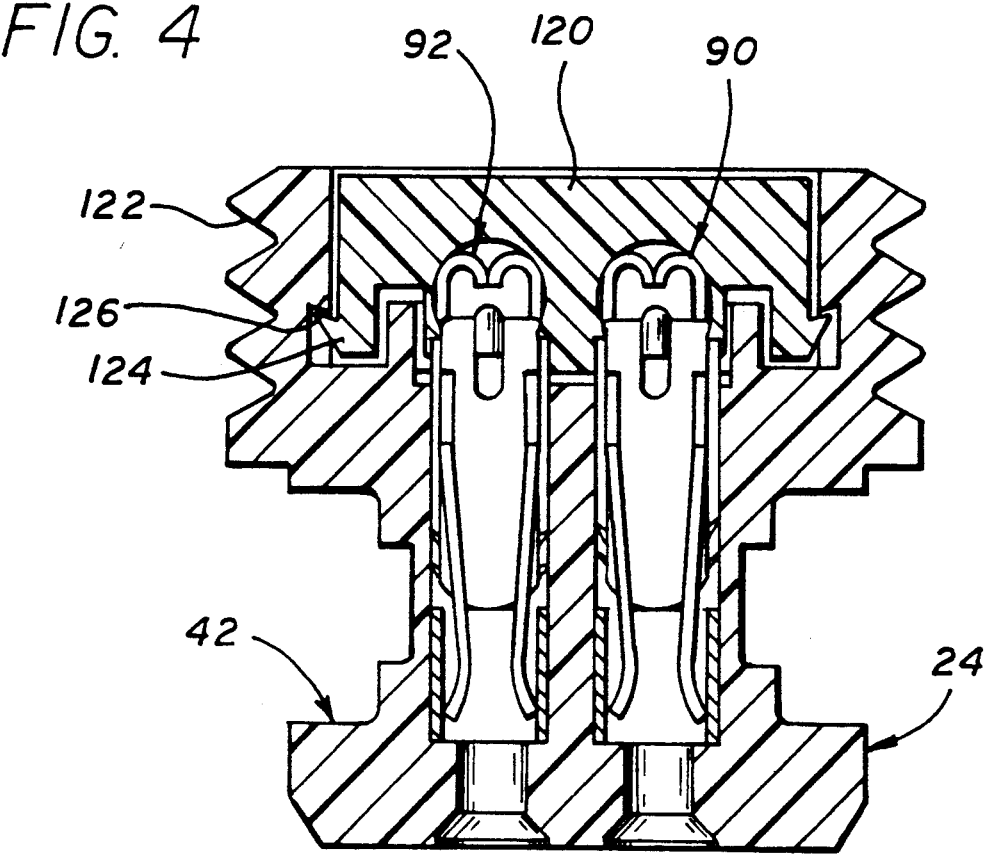
FIG. 4 is a sectional view of the connector of FIG. 3, taken on the line 4—4 thereof, but without the snap ring and spring ring thereof.

After the contact has been bent to its final position shown in FIG. 3, a cap part 120 of the frame upper portion 32 is pivoted down about a living hinge 121 until it latches to a lower part 122 of the frame upper portion 32. FIG. 4 shows latches or latch means 124 that snap below shoulders 126 on the lower part 122 of the frame. As shown in FIG. 1, the cap part 120 is narrower than the lower part 122 of the frame upper portion. As a result, the lower part 122 surrounds the cap part, at least at its opposite sides 120a, 120b. This is advantageous in that it minimizes exposed edges on which loose wires could snag.

The middle part 110 (FIG. 9) of the contact has an elongated protrusion 130 in the otherwise stripped-shaped middle. The purpose of the protrusion is to minimize spring-back of the middle portion 110 after it has been bent about 90°.

Referring to FIG. 3, it can be seen that applicant installs a ferrite element 140 around each terminal 94, 96 of the initiator 16. A ferrite element, which is well known in the art, serves to add inductance to the terminal and contact, to minimize the spike of any pulsed current induced in the terminal. The terminal is largely shielded by the large metal base 14. However, electromagnetic energy can still pass largely downwardly through the hole constriction 60. The ferrite element tends to intercept much of such electromagnetic energy, by dissipating it to smooth out any spike.

Figure 6:
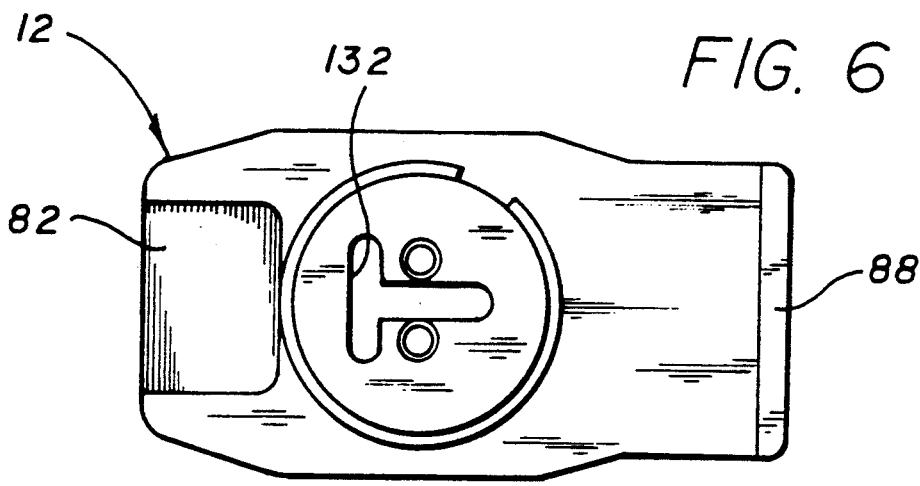
FIG. 6 is a bottom view of the connector of FIG. 4, with the rings installed thereon.

It may be noted that the initiator has a key at its top, which is received in a keyway 132 (FIG. 6) formed at the bottom of the mount portion 24 of the connector frame. The size and shape of the base and initiator are generally fixed by automobile manufacturers, and the connector is designed to fit the base and initiator of given specifications. The particular automobile airbag initiator-holding base 14 has a hole whose constriction location 60 has a diameter of 0.436 inch, and relative other dimensions as illustrated in FIG. 3. Applicant has constructed a connector of the illustrated configuration, and found that it could be pulled out with a force of fifty pounds and thereafter reliably reinstalled.

Thus, the invention provides a connector which can be installed in a hole of a base and locked therein, and which can be removed and securely reinstalled. The connector includes a frame with a mount portion having a recess, and a snap ring with a gap that lies within the recess and that is designed to snap into an undercut groove formed in a hole of the base. A spring ring, preferably of soft elastomeric material which is at least two orders of magnitude more deformable that the material of the snap ring, lies between the inside of the snap ring and the radially inner surface of the recess. The spring ring keeps the snap ring centered in the recess so it does not fall out during handling, and keeps the snap ring centered in the recess during installation to aid in such installation. The connector includes at least one contact with vertically and horizontally extending portions and a middle portion bent by about a 90° angle. The middle portion is bent against a convex wall of the frame, where vertically and horizontally extending passage portions of the frame meet. The frame includes an upper portion lying over the base and having a cap part that can pivot on a living hinge against a lower part, to cover the bent contact, the cap part preferably being narrower than the lower part and surrounded on opposite sides by the lower part.

Although particular embodiments of the invention have been described and illustrated herein, it is recognized that modifications and variations may readily occur to those skilled in the art, and consequently, it is intended that the claims be interpreted to cover such modifications and equivalents.

I claim:

1. An assembly of an electrical connector and base wherein said base has a hole with a top and with an annular groove below said top, and said connector has a frame with a mount portion that fits into said hole and has a snap ring lying about said mount portion for snapping into said groove when said mount portion is installed on said base, characterized by:

said snap ring is formed of resilient but nonelastomeric material and has a gap in it, and said frame mount portion has a recess that holds said snap ring while allowing said snap ring to contract and expand, said gap subtending a sufficient angle and said snap ring having sufficient resilience and a sufficiently large inside diameter when unrestrained, that said snap ring can readily fall off said frame mount during handling of said frame mount before it is mounted on said connector, if not retained on said frame, said connector includes a spring ring that is much more easily compressed than said snap ring and that lies between said snap ring and said mount portion, to keep said snap ring centered in said recess and thereby help prevent said snap ring to contract in diameter during its movement down into said hole unit it snaps into said groove, said spring ring being of smaller average height than the maximum height of said snap ring and of smaller cross section than said annular groove, so that said spring ring can fit in said annular groove when said spring ring is compressed.

2. A connector comprising:

a molded frame having a mount portion with an annular recess and with an axis that extends along a height direction;

a continuous elastomeric spring ring lying closely in said annular recess;

a snap ring which is formed of a nonelastomeric resilient material and which has a gap in it, said snap ring lying in said recess closely around said spring ring;

said elastomeric spring ring is of smaller height than said snap ring;

said recess has a radially outer portion which closely guides said snap ring in radial expansion and contraction, and has a radially inner portion of smaller height than said outer portion with said elastomeric ring lying partially in said inner portion.

3. The connector described in claim 2 including:

a base with a hole for receiving said mount portion, said hole having a constriction location which said snap ring must pass across during installation of said connector in said base;

said recess and said rings are constructed so when said snap ring lies within said constriction location, said elastomeric ring is compressed into a hat shape with the upstanding hat part of the hat shape lying in said inner recess portion and the hat rim lying in said outer portion of said recess.

4. An assembly of a connector and base wherein said base has a hole with a top and with an annular groove below said top, and said connector has a frame with a mount portion that first into said hole and has a snap ring lying about said mount portion for snapping into said groove when said mount portion is installed on said base, characterized by:

said snap ring is formed of nonelastomeric material and has a gap in it and said mount portion has a recess that holds said snap ring while allowing said snap ring to contract and expand;

said connector includes an easily radially compressed spring ring that is much more easily compressed than said snap ring and that lies between said snap ring and said mount portion, to help prevent said snap ring from falling off said mount portion while allowing said snap ring to contract in diameter during its movement down into said hole unit it snaps into said groove;

said connector has at least one sheet metal contact lying in said frame, said contact having vertically and horizontally extending portions and having a middle portion bent at substantially a right angle;

said frame having a vertically extending passage portion that closely receives said vertically-extending contact portion and having a horizontally-extending passage portion that receives said horizontally extending contact portion;

said frame forming a convex wall lying closely within said bend, to support said middle portion during its bending from a substantially straight configuration to said substantially right angle after said vertically-extending contact portion was inserted into said vertically extending passage portion.

5. The assembly described in claim 4 wherein:

said middle portion comprises a flat strip portion with an elongated protrusion in said strip portion extending around bend, whereby to minimize springback after bending.

6. The assembly described in claim 4 wherein:

said frame has an upper portion that lies over said base and that forms said horizontally-extending passage portion, said upper portion including a lower part fixed to said mount portion and forming a lower half of said horizontal passage portion, and a cap part forming a living hinge integral with said lower part and forming an upper half of said horizontal passage portion, said cap part having latch means for locking it against said lower part when pivoted about said living hinge.

7. An assembly of a connector and base wherein said base has a hole with a top and with an annular groove below said top, and said connector has a frame with a mount portion that fits into said hole and has a snap ring lying about said mount portion for snapping into said groove when said mount portion is installed on said base, characterized by:

said snap ring is formed of nonelastomeric material and has a gap in it, and said frame mount portion has a recess that holds said snap ring while allowing said snap ring to contract and expand;

said connector includes an easily radially compressed spring ring that is much more easily compressed than said snap ring and that lies between said snap ring and said mount portion, to help prevent said snap ring from falling off said mount portion while allowing said snap ring to contract in diameter during its movement down into said hole unit it snaps into said groove;

said base hole has an axis and said spring ring has an axis;

said main frame has an upper portion that lies over said base and which has first and second opposite ends, said first end having a recess for receiving a screwdriver blade to pry out said connector from said base, and said second end being spaced from said base except that said second end has an extreme second end portion forming a foot which abuts said base when the axis of said spring ring is aligned with the axis of said base hole.

8. A connector comprising:

a molded plastic insulative frame that includes a lower mount portion and an upper portion, said frame forming a contact-holding passage including a vertically-extending portion in said lower mount portion and a substantially horizontally-extending portion in said upper portion;

a sheet metal contact having vertically and horizontally extending portions each having an axis and having a strip-like portion on a first side of a corresponding one of said axes and a sidewardly bent portion extending away from the corresponding strip portion to at least partially envelope a corresponding one of said axes, said contact having a middle portion where only said strip-like portions merge;

said frame having a corner portion at the intersection of said passage portions, said middle portion being bent about 90° by and around said corner portion;

said frame upper portion includes a lower part fixed to said mount portion and forming a lower half of said horizontal passage portion, and a cap part forming an upper half of said horizontal passage portion, said cap part and lower part forming a latch that locks them together when said cap part is pivoted down against said lower part.

9. The connector described in claim 8 wherein:

said cap part is narrower than said lower part, and said lower part surrounds said cap part in its pivoted down position, whereby to avoid snagging of wires on said frame upper portion.

10. A connector comprising:

a molded plastic insulative frame that includes a lower mount portion and an upper portion, said frame forming a contact-holding passage including a vertically-extending portion in said lower mount portion and a substantially horizontally-extending portion in said upper portion;

a sheet metal contact having vertically and horizontally extending portions each having an axis and having a strip-like portion on a first side of a corresponding one of said axes and a sidewardly bent portion extending away from the corresponding strip portion to at least partially envelope a corresponding one of said axes, said contact having middle portion where only said strip-like portions merge;

said frame having a corner portion at the intersection of said passage portions, said middle portion being bent about 90° by and around said corner portion;

said mount portion has an annular recess; and including a continuous elastomeric spring ring lying in said recess;

a snap ring which is formed of a nonelastomeric elastic material and which has a gap in it, said snap ring lying closely around said spring ring.

* * * * *